United States Patent [19]

Van Over

[11] Patent Number: 6,004,600
[45] Date of Patent: Dec. 21, 1999

[54] METHOD OF MAKING BREAD

[76] Inventor: Charles Van Over, 49 Ferry Rd., P.O. Box 449, Chester, Conn. 06412

[21] Appl. No.: 09/183,429

[22] Filed: Oct. 30, 1998

[51] Int. Cl.$^6$ ................................................... A21D 8/00
[52] U.S. Cl. ........................... 426/231; 426/19; 426/496; 426/504
[58] Field of Search ............................. 426/231, 19, 496, 426/504, 519

[56] References Cited

U.S. PATENT DOCUMENTS

| | | | |
|---|---|---|---|
| 4,107,341 | 8/1978 | Seiling | 426/19 |
| 4,407,827 | 10/1983 | Tanaka et al. | 426/504 |
| 4,419,374 | 12/1983 | Pei | 426/243 |
| 4,667,591 | 5/1987 | Garbar et al. | 99/483 |
| 4,776,265 | 10/1988 | Ojima | 99/348 |
| 4,877,191 | 10/1989 | Golob et al. | 241/92 |
| 5,379,953 | 1/1995 | Rebordosa et al. | 241/101.2 |
| 5,380,086 | 1/1995 | Dickson | 99/348 |
| 5,466,913 | 11/1995 | Tanimoto et al. | 99/348 |
| 5,479,850 | 1/1996 | Anderson | 99/357 |
| 5,560,944 | 10/1996 | Angeli et al. | 426/504 |

OTHER PUBLICATIONS

Baking, The Art and Science, A Practical Handbook For The Baking Industry, Published by Baker Tech. Inc., Calgary, Alberta, Canada, pp. 60–62.

Article: Country–style bread with a mixed starter.
Article: Country–style bread with a natural starter.
Article: Country–style bread with a yeast starter.
Article: How to Make Bread.
Article: A Lazy Man's Bread, Homemade and Good.
Baking with Julia, Baking Basics, Terms/Techniques, pp. 14 & 15.

*Primary Examiner*—George C. Yeung
*Attorney, Agent, or Firm*—Pearne, Gordon, McCoy & Granger LLP

[57] ABSTRACT

A method of making bread dough, pizza dough, and bread using a food processor having a cutting blade. Flour, yeast, and salt are placed in a bowl of the mixer and their temperature is taken to obtain a dry component temperature. Depending on the type of mixer selected, a base temperature of either about 130° F. or about 150° F. is selected. The dry component temperature is subtracted from the base temperature to obtain a calculated liquid temperature. The temperature of a quantity of water is adjusted to the calculated liquid temperature. The mixer is started and the water is added to the bowl. The mixer is allowed to run for about 45 seconds and is then turned off. The dough is allowed to ferment and is then formed into loaves or pizza crusts, which are baked in an oven.

27 Claims, 1 Drawing Sheet

METHOD OF MAKING BREAD

BACKGROUND OF THE INVENTION

This invention relates to food preparation in general and, more particularly, to a method of making bread dough, pizza dough, bread, and pizza crust.

Bread has four basic components: flour, salt, yeast, and a liquid. The components are typically added together in a container at the same time to form a mass of dough. The yeast, however, is usually mixed with a small amount of warm water before it is added to the container in order to dissolve the yeast.

Flour contains proteins, starches, and sugars. When flour is mixed with a liquid, such as water, the proteins react and form gluten. Gluten creates an elastic strand in the bread dough. The yeast in the dough consumes the sugars in the dough as the yeast feeds itself. As the yeast feeds, the dough ferments. The elastic strands in the gluten trap and retain the carbon dioxide in the dough, thereby causing the dough to rise. The yeast in the dough ferments the sugars to generate alcohol and carbon dioxide. In order to increase the retention of carbon dioxide in the dough, the gluten is formed into an elastic web by physically manipulating the dough through kneading.

Many home bakers knead the dough by hand, using an electric mixer equipped with a helical mixing arm called a "dough hook", or using an electric mixer such as a food processor equipped with a plastic dough blade. Commercial bakeries mix dough by hand or using an electric mixer equipped with a helical, spiral, or oblique mixing arm. Often, the home baker kneads the dough in the mechanical mixer for 10 minutes or so. The commercial baker kneads the dough in the mechanical mixer for up to 20 minutes.

After the dough is kneaded, the dough is left to ferment and then molded into a desired shape, such as a loaf. The dough is then "proofed", that is, allowed to sit for a period of time in order to allow the dough to rise and take its final shape. Typically, the bread is proofed at a slightly elevated temperature to increase the activity of the yeast. After being proofed, the dough is baked for a period of time to form bread.

The quality of the bread made pursuant to the foregoing prior art method can be adversely affected by several factors. For example, the mechanical mixer exposes the dough to an enormous amount of air when it kneads the dough, especially if the mechanical mixer is utilized for an extended period of time such as ten minutes. The chemical process known as "oxidation" takes place. During oxidation, oxygen in the ambient air leaches out some of the color, flavor, and nutrients in the dough. In many instances, the mechanical mixer actually puts air into the dough, thereby causing the bread to be featherlight and bland.

Another factor that can adversely affect the quality of the bread is mixing the dough at too high of a temperature. The mechanical mixer heats the dough significantly, especially if the mechanical mixer is utilized for an extended period of time such as ten minutes. If the temperature of the dough is too high, the yeast is too active, might be killed and, thus, the bread will not rise properly. Some techniques have attempted to overcome the problem of heating during mixing by precooling the ingredients, cooling the bowl during mixing, or both.

Based upon the foregoing, there is a need in the art for an improved method of making bread dough and pizza dough. The present invention is directed to such a method.

SUMMARY OF THE INVENTION

It therefore would be desirable, and is an advantage of the present invention, to provide an improved method of preparing dough and making bread. In accordance with the present invention includes the steps of selecting a mixer having a blade and a mixing bowl; selecting liquid components; selecting dry components comprising flour and yeast; adding the dry components to the mixing bowl; measuring the temperature of the dry components to obtain a dry component temperature; selecting a base temperature in a range of about 100–200° F.; subtracting the dry component temperature from the base temperature to obtain a calculated liquid temperature; adjusting the temperature of the liquid components to the calculated liquid temperature; starting the mixer; adding the liquid components to the mixer, thereby forming dough from the dry components and the liquid components; stopping the mixer after the mixer has run for a mix period of time, said mix period of time beginning when the mixer is started and being in a range of about 15–120 seconds; and allowing the dough to sit for a fermentation period of time. The dough can then be baked in an oven at a baking temperature for a baking period of time.

DETAILED DESCRIPTION OF THE PREFERRED EMBODIMENTS

Figure 1:
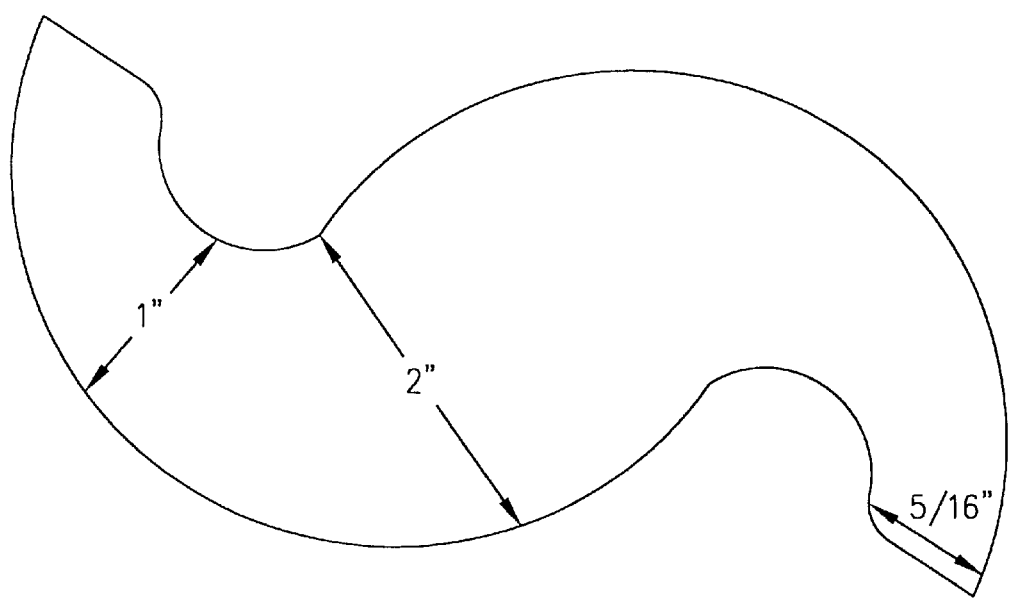
FIG. 1 shows an outline of a wide blade used in accordance with the invention.

As used herein, a "cup" is a unit of measurement equal to 8 fluid ounces and a "teaspoon" is a unit of measurement equal to 0.1667 fluid ounces, unless otherwise indicated or apparent. In addition, parts are parts by weight and percents are weight percents unless otherwise indicated or apparent. When a preferred range such as 5–25 is given, this means preferably at least 5 and preferably not more than 25.

The method of the present invention utilizes a food processor and other culinary implements to produce an improved bread from a dough comprised of four basic components: flour, salt, yeast, and water. Other components, however, may be added to suit a particular baker's tastes, such as fruits, nuts, grains, vegetables, milk, butter, eggs, and oil.

Flour derived from wheat berries contains proteins, which are converted to gluten when a liquid is added. The gluten is further developed during the mixing or kneading procedure. The flour also contains sugars, such as glucose, fructose, maltose, and sucrose. The flour may be bread flour, all-purpose flour, whole wheat flour, or any other desired type of flour having a sufficiently high gluten content. Preferably, the gluten content of the flour is at least 8 percent. Blends of different types of flours may also be used. The particular type of flour that is selected is determined by the bread properties desired by a particular baker. Preferably, the flour is unbleached and unbromated. A suitable selection for the flour is sold under the name King Arthur Special Bread Flour by King Arthur Flour Baker's Catalogue. Innumerable other available flours are also suitable.

The salt provides flavor to the dough, enhances the taste of the flour, contributes to the color of the bread, and keeps the yeast from growing too quickly. The salt may be table salt, fine sea salt, kosher salt, or pickling salt. Preferably, the salt is kosher salt, or pickling salt, or more preferably, fine sea salt.

The yeast ferments sugars in dough to produce carbon dioxide, which causes the dough to rise. The yeast may be instant yeast, active dry yeast, or compressed cake yeast. A suitable selection for the yeast is sold under the name SAF Instant by SAF Products of Minneapolis, Minn. Instead of or in addition to adding yeast directly, the yeast can be provided in a mixture called a "starter". This is a blend of flour and liquid, such as water, that has fermented. The starter develops active yeast organisms.

The water in the dough moistens the flour, enabling the yeast and enzymes in the dough to activate and begin the process of fermentation. As will be described more fully later, water also helps to regulate the temperature of the dough. Preferably, the water is not overly chlorinated.

There are two common types of electric mixers. The first type, stand mixers, have a blade that is inserted into the bowl from above. These include percussion mixers, one-arm lifting mixers, double-cone mixers, spiral mixers, and twisting mixers. These operate at speeds ranging from 25 to 300 revolutions per minute. The second type, food processors, have a blade at the bottom of the bowl driven by a motor under the bowl. These are commonly known as "high speed blenders", "circular impact mixers", or "vertical cutting mixers". These operate at speeds ranging from 1500 to 3600 revolutions per minute. The invention is particularly suited for food processors.

The food processor includes a mixing bowl for holding the components and a rotatable blade for mixing the components in the mixing bowl. In some cases, the food processor includes a feed tube through which the components may be added to the mixing bowl. Preferably, the blade is thin with sharp edges so as to produce less friction when mixing dough. A suitable selection for the blade is a metal cutting blade commonly used in food processors to cut, mince, or dice vegetables and other food items. The blade has two arcuate, tapering components extending radially from a center shaft. For the home baker, the mixing bowl has a capacity of about 11 cups. For the commercial baker, the mixing bowl has a capacity of up to 4000 pounds.

Suitable selections for the domestic food processor include vertical cutting mixers sold by the following companies: Braun, Inc. of Lynnfield, Mass.; Cuisinart of Stamford, Conn.; Black+Decker of Shelton, Conn.; Krups North America, Inc. of Closter, N.J.; and De Longhi. Suitable selections for the commercial food processor include vertical cutting mixers sold by Hobart Corp of Troy, Ohio; Robot Coupe USA, Inc. of Jackson, Miss.; Stephan USA of Columbus, Ohio; KitchenAid—Whirlpool Corporation of Benton Harbor, Mich.; and Waring. The Cuisinart, KitchenAid, Black+Decker, and Krups food processors have direct drive motors, which efficiently mix dough without stalling. The Braun has a variable speed motor. Several other processors have two speed operation, the lower speed (around 1750 RPM) being used in accordance with the invention. As will be more fully described later, the type of blade and speed of the blade affect regulation of the temperature of the dough. All of these mixers except the Braun mixer use a blade that is substantially the same as the Stephan mixer and operate at about 1700 to 1800 revolutions per minute. The Braun mixer is preferably operated at a middle range speed (setting no. 3) around 1750 revolutions per minute.

In a first embodiment of the present invention, 100 parts of the flour are used with preferably about 60–70 parts of the water, more preferably about 63 parts of the water. Preferably about 1–3 parts of the salt is used, more preferably about 2 parts of the salt is used. Less than about 1 part of the yeast is preferably used.

Figure 2:
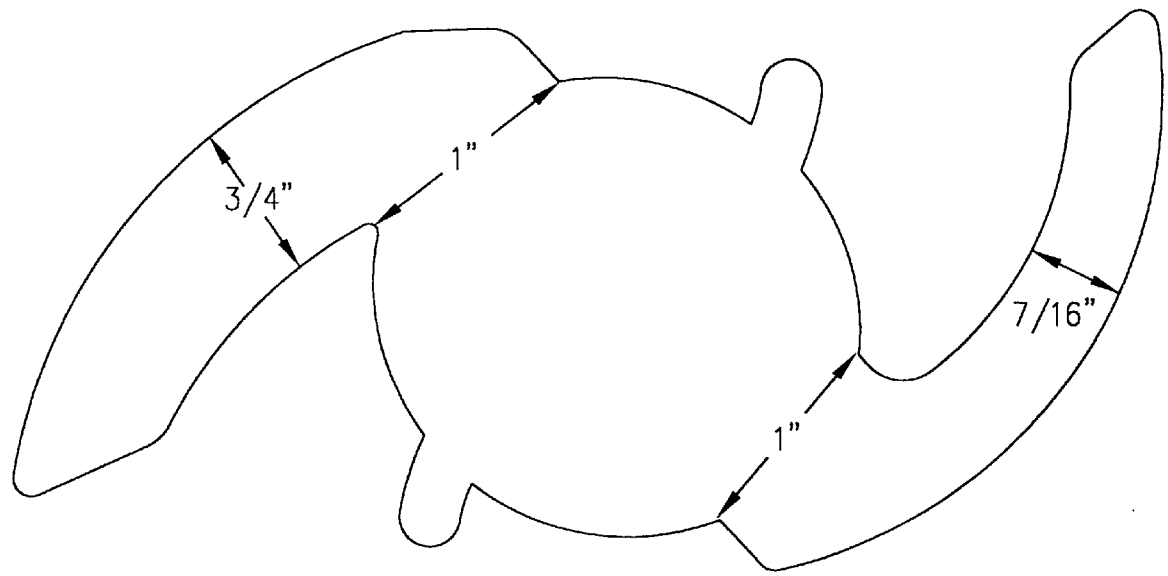
FIG. 2 shows an outline of a narrow blade used in accordance with the invention.

The flour, the salt, and yeast (collectively the "dry components") are added to the mixing bowl of the mixer and their fahrenheit temperature is taken using an instant-read thermometer. The temperature of the dry components is subtracted from a base temperature to obtain a calculated liquid temperature. The base temperature is selected from a range of about 100–200° F., more preferably about 120–160° F. The base temperature is determined by blade construction and mixer speed. The greater the friction created by the blade and/or the higher the speed of the blade, the lower the base temperature. All commonly available commercial food processors currently use one of two blades. The blades have two arcuate sections projecting radially in opposite directions from a central base and vertically offset from each other. All except the Braun use the blade shown in FIG. 1. The width of the blade is about 2 inches at the base and tapers to about 1 inch at a middle portion. The Braun model uses a narrower blade FIG. 2 than the other models, which results in less friction. The blade is about 1 inch wide at the base; one section tapers to about ¾ inch at a middle portion and the other section tapers to about 7/16 inch at a middle portion.

Using the Braun model, the base temperature is preferably selected from a range of about 140–160° F., most preferably about 150° F., whereas if the food processor is another model, such as the Stephan, Cuisinart, KitchenAid, or Black+Decker models, the base temperature is preferably selected from a range of about 120–140° F., most preferably about 130° F. Thus, if 130° F. is used as the base temperature and the temperature of the dry components is 70° F., then the calculated liquid temperature is 60° F., whereas if 150° F. is used as the base temperature and the temperature of the dry components is 70° F., then the calculated liquid temperature is 80° F. For blade speeds and configurations other than those commonly available now, the base temperature is selected based on the speed and characteristics of the blade relative to the examples herein. Using a blade that adds more heat to the dough requires a lower base temperature and vice versa.

The temperature of the water and any other desired liquid components, such as eggs, (collectively the "liquid components") is adjusted to the calculated liquid temperature. If the water is tap water, the temperature is easily adjusted by manipulating the cold and hot water supplies, otherwise heating means, such as a stove, or cooling means, such as ice, can be employed. The food processor is then turned on and all but about 6–7 parts of the liquid components are added to the mixing bowl through the feed tube. After the food processor has run for about 10–30 seconds, more preferably about 25 seconds, the condition of the dough is checked. If the dough appears crumbly and dry and does not come together into a ball, the remaining liquid components are added to the mixing bowl. The food processor is preferably allowed to run for a mix period of time of about 15–120 seconds, more preferably about 30–90 seconds, more preferably about 40–60 seconds, more preferably about 45 seconds, and then is turned off. For the best results, the mix time should not exceed about 45 seconds.

After the mix period of time, the food processor is turned off and the temperature of the dough is taken. The dough should be in a desired range of about 75–80° F. If the temperature is lower than 75° F., the food processor is turned on to mix the dough for an additional period of time of preferably about 5–10 seconds, more preferably about 5 seconds. The temperature is taken again and, if still below 75° F., the food processor is turned on to mix the dough for another additional period of time of preferably about 5–10 seconds, more preferably about 5 seconds. This procedure is repeated until the temperature of the dough is in the desired range.

If the temperature of the dough is higher than 80° F., the dough is removed from the mixing bowl and deposited in an ungreased holding bowl. The holding bowl is then placed in a refrigerator for a cooling period of about 5 minutes. After the cooling period of time, the holding bowl is removed from the refrigerator and the temperature of the dough is checked. If the temperature of the dough is not below 80° F., the holding bowl is returned to the refrigerator for an additional cooling period of about 5 minutes. This procedure is repeated until the temperature of the dough is in the desired range.

Once the dough is mixed in the food processor for the mix period of time and has a temperature in the desired range, the dough is removed from the mixing bowl and placed in an ungreased holding bowl (unless this has already been done to cool the dough). The dough is covered with plastic, plastic wrap, or other covering to prevent evaporation of surface moisture and the development of a dry crust. The covered dough is allowed to sit for a first fermentation period of time at a room temperature preferably in a range of about 65–75° F., more preferably about 70–72° F. Preferably, the first fermentation period of time is about 1–4 hours. The correct fermentation time depends on several factors including character of flour, amount of yeast, temperature, formula ingredients, and level of oxidation. Experience will demonstrate the best fermentation procedure. The fermentation time is inversely proportional to the amount of yeast used and the dough temperature. Typically, fermentation is considered complete when dough volume increases by about ¾, usually after 3 to 4 hours.

The present invention is particularly suitable for making pizza crusts. For pizza, a more moist dough is prepared using less yeast and a different flour having less protein so that less gluten is formed. According to the method the dough is not fully developed, which means that the dough is workable longer than fully developed doughs. Pizza dough can be prepared and left to ferment overnight. Pizza crusts can then be formed the next day. Pizza dough and yeasted flat breads normally are not proofed. Instead, they are baked immediately after forming.

After the first fermentation period of time, the dough is removed from the holding bowl and placed on a lightly floured work surface. With a dough scraper or kitchen knife, the dough is divided into a plurality of equal pieces, which are then formed into generally spherical balls. In a commercial bakery, the dough may be transferred to a mechanical device that divides the dough into specific pieces for hand shaping. The dough may also be transferred to other devices for further forming of the dough into shapes for baking. The dough balls or shapes are covered with a sheet of plastic, plastic wrap, cloth, or other covering and allowed to sit for a second fermentation period of time at the room temperature. Preferably, the second fermentation period of time is about 10–30 minutes, more preferably about 15–20 minutes. Generally, a second fermentation period is not required for pizza dough. Fermented and formed dough can be frozen and stored.

After the second fermentation period of time, each dough ball is formed into a baguette, loaf, or other final form. According to one technique for forming the dough, the dough ball is placed on a work surface covered with a fine coating of flour. The dough ball is flattened into a generally rectangular shape measuring about 4 inches by 5 inches and about 1 inch thick. A longer side of the dough is folded inwardly about ⅔ of the distance to an opposing side of the dough so as to form a first folded edge, which is then sealed with a palm of a hand. The opposing side of the dough is folded inwardly about ⅔ of the distance to the first folded edge so as to form a second folded edge, which is then sealed with a palm of a hand. In this manner, the opposing sides of the dough overlap so as to form a plank.

The plank is then folded lengthwise and the edges pressed together so as to form a cylinder with a seam running the length thereof. The cylinder is then gently rolled back and forth. Care is exercised to avoid stretching the dough. As the cylinder is rolled back and forth, the cylinder lengthens. Once a desired length is obtained, the rolling ceases and the formation of the loaf is complete. Preferably, the loaf will be about 12–14 inches long and have a diameter of about 2.5 inches.

After formation, the loaves are placed on a lightly floured cloth. Preferably, the cloth is folded to form a plurality of channels within which the loaves are disposed. The loaves are preferably placed close together so as to rise instead of spread out. The loaves are sprinkled with flour and then loosely covered with plastic wrap or a kitchen towel. The loaves are then allowed to proof for a proofing period of time at the room temperature so as to allow the baguette to increase in size by about 50%, but still be soft to the touch and spring back slightly when poked. Preferably, the proofing period of time is about 15–120 minutes, more preferably about 20–60 minutes, more preferably about 30–45 minutes.

During the fermentation periods of time and/or the proofing period of time, an oven is prepared for baking. A small pan preferably having a capacity of at least one cup is placed on a floor of the oven. A rack is disposed in a penultimate position above the floor of the oven. A baking stone is then placed on the rack and the oven is preferably preheated to about 4750 for about an hour.

After the fermentation period of time, the loaves are uncovered and placed with their seams down on a peel or a baking sheet lightly sprinkled with cornmeal. Alternately, the loaves are placed in greased and lightly floured baguette pans. Each loaf is sprinkled lightly with flour and then scored, i.e., a plurality of diagonal slashes are formed in the top of the loaf with a razor blade.

About 1 cup of warm water is poured into the pan on the floor of the oven. The loaves are then slid from the peel or the baking sheet onto the baking stone in the oven. If baguette pans are used, the baguette pans are placed on the baking stone. The heat of the oven is then reduced to a baking temperature preferably in a range of about 400–500° F., more preferably about 450° F.

The loaves are allowed to bake in the oven for about 2 minutes and then another cup of water is added to the pan. Afterwards, the loaves are allowed to bake in the oven for a baking period of time until the crusts of the loaves are a golden brown, or until the interior temperatures of the loaves are about 205–210° F. Preferably, the baking period of time is about 15 to 30 minutes, more preferably about 20 to 22 minutes.

After the baking period of time, the loaves are removed from the oven and allowed to cool completely. The loaves may then be consumed or stored.

In a second embodiment of the present invention, the components are selected, mixed, and allowed to sit for the first fermentation period of time, all in the same manner as in the first embodiment. Instead of continuing with the formation of the dough balls, however, the dough is retarded, that is, placed in a refrigerator or specially designed cooling device at a reduced temperature for an extended retardation period of time. Formed shapes of the dough can also be retarded. Preferably, the reduced temperature is in a range of about 37–45° F. Preferably the extended retardation period of time is about 11–24 hours, more preferably about 12–16 hours. The dough is then removed from the refrigerator and allowed to warm at room temperature so as to be sufficiently malleable. Afterwards, the dough is formed into spherical balls and processed in accordance with the remaining steps of the first embodiment.

In a third embodiment of the present invention, the components are selected, mixed, and allowed to sit for the first fermentation period of time, all in the same manner as in the first embodiment. Instead of continuing with the formation of the dough balls, however, the dough is placed in the refrigerator at the reduced temperature for an abbreviated retardation period of time. Preferably the abbreviated retardation period of time is 2–6 hours, more preferably about 3–4 hours. The dough is then removed from the refrigerator and allowed to warm at room temperature so as to be sufficiently malleable. Afterwards, the dough is formed into spherical balls and processed in accordance with the remaining steps of the first embodiment.

The method of the present invention surprisingly and unexpectedly provides many advantages over prior art methods. In contrast to other prior art methods, the method of the present invention produces a bread that is less oxidized, has a rich golden color, has more pronounced wheat flavor, and has characteristic irregular alveolate structure. Moreover, the method is simple to follow and produces consistent results.

The following Examples further illustrate various aspects of the invention. Unless otherwise indicated, the components are combined using methods known in the art or as described above.

EXAMPLE 1

Bread was prepared in accordance with the present invention by selecting 500 grams of unbleached bread flour, 10 grams of fine sea salt, 1 teaspoon of instant yeast, and 315 grams of water. The flour, the salt and the instant yeast were added to a bowl of a Braun vertical-cutting mixer equipped with a metal cutting blade. The temperature of the flour, the salt, and the yeast were measured. The temperature of the water was then adjusted to arrive at a base temperature of 150° F. The mixer was turned on and the water was added to the mixing bowl. The mixer was allowed to run for 45 seconds and was then turned off.

The dough was removed from the mixer and allowed to sit at a room temperature of about 72° F. for about 1.5 hours. The dough was then formed into three balls and allowed to sit at the room temperature for about 15 minutes. The balls were formed into loaves and then proofed at the room temperature for about 30 minutes. The loaves were then scored and placed on a baking stone in a preheated oven. The loaves were baked at 450° F. for about 22 minutes. The bread produced in this example had a fluffy crumb and a rich, full taste.

EXAMPLE 2

Bread was prepared in accordance with the present invention by selecting 500 grams of unbleached bread flour, 10 grams of fine sea salt, 1 teaspoon of instant yeast, and 315 grams of water. The flour, the salt and the instant yeast were added to a bowl of a Braun vertical-cutting mixer equipped with a metal cutting blade. The temperature of the flour, the salt, and the yeast was measured. The temperature of the water was then adjusted to arrive at a base temperature of 150° F. The mixer was turned on and the water was added to the mixing bowl. The mixer was allowed to run for 45 seconds and was then turned off.

The dough was removed from the mixer and allowed to sit at a room temperature of about 72° F. for about 1.5 hours. Afterwards, the dough was placed in a refrigerator at a reduced temperature of about 37° F. for 12 hours. The dough was then removed from the refrigerator and allowed to warm at room temperature. The dough was formed into three balls and allowed to sit at the room temperature for about 15 minutes. The balls were formed into loaves and then proofed at the room temperature for about 30 minutes. The loaves were then scored and placed on a baking stone in a preheated oven. The loaves were baked at 450° F. for about 22 minutes. The bread produced by this example had a more compact crumb with a deeper color and chewier texture.

EXAMPLE 3

Bread was prepared in accordance with the present invention by selecting 350 grams of durum wheat flour, 150 grams of unbleached bread flour, 10 grams of fine sea salt, 0.75 teaspoons of instant yeast, 315 grams of water, and 60 grams of sesame seeds. The flour, the salt and the instant yeast were added to a bowl of a Cuisinart vertical-cutting mixer equipped with a metal cutting blade. The temperature of the flour, the salt, and the yeast was measured. The temperature of the water was then adjusted to arrive at a base temperature of 130° F. The mixer was turned on and the water was added to the mixing bowl. The mixer was allowed to run for 20 seconds and was then turned off. The dough was allowed to sit in the mixing bowl for about 5 minutes. Afterwards, the mixer was turned on and allowed to run for an additional 25 seconds, for a total of 45 seconds.

The dough was removed from the mixer and allowed to sit at a room temperature of about 72° F. for about 2 hours. The dough was then formed into two balls and allowed to sit at the room temperature for about 15 minutes. The balls were covered with a fine layer of flour and then formed into football-shaped loaves. Each loaf was lightly brushed with water and then sprinkled with the sesame seeds. The loaves were then proofed at the room temperature for about 1 hour. Afterwards, a plurality of 2" deep cuts were made along the edge of each loaf. The loaves were then gently curved into a mezzaluna, or half-moon shape so that the cuts opened slightly. The loaves were placed on a baking stone in a preheated oven. The loaves were baked at 450° F. for about 22 minutes. The bread produced in this example produced a bread with a delicate open crumb and a chewy texture.

EXAMPLE 4

Bread was prepared in accordance with the present invention by selecting 10 kilos of bread flour, 200 grams fine sea salt, 60 grams instant yeast, and 630 grams water. The flour, salt, and the instant yeast were added to the bowl of a Stephan vertical cutting mixer equipped with a metal cutting blade. The temperature of the flour, yeast, and the salt were measured. The temperature of the water was then adjusted to arrive at a base temperature of 130° F. The water was added then the cover was placed on the mixer. The mixer was turned on immediately, allowed to run for 45 seconds, and turned off.

The dough was removed from the mixer and allowed to sit at a room temperature of about 72° F. for about 1.5 hours. Afterwards, the dough was placed in a refrigerator at a reduced temperature of about 37° F. for 12 hours. The dough was then removed from the refrigerator and allowed to warm at room temperature. The dough was formed into three balls and allowed to sit at the room temperature for about 15 minutes. The balls were formed into loaves and then proofed at the room temperature for about 30 minutes. The loaves were then scored and placed on a baking stone in a preheated oven. The loaves were baked at 450° F. for about 22 minutes. The bread produced by this example had a more compact crumb with a deeper color and chewier texture.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of preparing dough, said method comprising the steps of:
   selecting a mixer having a blade and a mixing bowl;
   selecting liquid components;
   selecting dry components comprising flour and yeast;
   adding the dry components to the mixing bowl;
   measuring the temperature of the dry components to obtain a dry component temperature;
   selecting a base temperature in a range of about 100–200° F.;
   subtracting the dry component temperature from the base temperature to obtain a calculated liquid temperature;
   adjusting the temperature of the liquid components to the calculated liquid temperature;
   starting the mixer;
   adding the liquid components to the mixer, thereby forming dough from the dry components and the liquid components;
   stopping the mixer after the mixer has run for a mix period of time, said mix period of time beginning when the mixer is started and being in a range of about 15–120 seconds; and
   allowing the dough to sit for a fermentation period of time.

2. The method of claim 1, wherein the liquid components comprise water.

3. The method of claim 2, wherein about 53–95 parts of the water are selected per 100 parts of the flour selected.

4. The method of claim 1, wherein the yeast comprises a starter.

5. The method of claim 1, wherein the liquid components are added to the mixer while the mixer is running.

6. The method of claim 1, wherein the mixer is an electrically powered food processor.

7. The method of claim 1, where in the mixer is electrically powered, and the blade of the mixer is a metal cutting blade.

8. The method of claim 1, wherein the blade operates at a speed in a range of about 1000 to 3000 revolutions per minute.

9. The method of claim 1, wherein the blade operates at a speed of about 1700 to 1800 revolutions per minute.

10. The method of claim 1, wherein the blade has a mean width of about ½ to 1¼ inches.

11. The method of claim 1, wherein the mix period of time is in a range of about 30–90 seconds.

12. The method of claim 1, wherein the mix period of time is about 45 seconds.

13. The method of claim 1, wherein the mixer is a food processor and the base temperature is in a range of about 140–160° F.

14. The method of claim 1, wherein the base temperature is in a range of about 120–140° F.

15. The method of claim 1, further comprising the step of baking the dough in an oven at a baking temperature for a baking period of time.

16. The method of claim 1 further comprising the steps of removing the dough from the mixing bowl, forming the dough into a pizza crust, and baking the dough in an oven.

17. The method of claim 1, further comprising the steps of removing the dough from the mixing bowl, forming the dough into loaves, and proofing the loaves for a proofing period of time, said proofing period of time being in a range of about 30–45 minutes.

18. A method of preparing dough, said method comprising the steps of:
   selecting an electric food processor having a metal blade and a mixing bowl;
   selecting liquid components comprising water;
   selecting dry components comprising flour and yeast;
   adding the dry components to the mixing bowl;
   measuring the temperature of the dry components to obtain a dry component temperature;
   selecting a base temperature in a range of about 120–160° F.;
   subtracting the dry component temperature from the base temperature to obtain a calculated liquid temperature;
   adjusting the temperature of the liquid components to the calculated liquid temperature;
   starting the food processor;
   adding the liquid components to the food processor, thereby forming dough from the dry components and the liquid components;
   stopping the food processor after it has run for a mix period of time, said mix period of time beginning when the food processor is started and not exceeding 120 seconds; and
   allowing the dough to sit for a fermentation period of time.

19. The method of claim 19, further comprising the step of baking the dough in an oven at a baking temperature for a baking period of time.

20. The method of claim 19, wherein the mix period of time is in a range of about 30–90 seconds.

21. The method of claim 18, wherein the mix period of time does not exceed 50 seconds.

22. The method of claim 18, wherein the blade operates at a speed in a range of about 1000 to 3000 revolutions per minute.

23. The method of claim 18, wherein the blade operates at a speed of about 1700 to 1800 revolutions per minute.

24. The method of claim 18, wherein the blade has a mean width of about ½ to 1¼ inches.

25. The method of claim 18, further comprising the steps of:

forming the dough into loaves;

proofing the loaves for a proofing period of time, said proofing period of time being in a range of about 30–45 minutes; and scoring the loaves.

26. The method of claim 18, further comprising the step of placing the dough in a cooler at a reduced temperature for a retardation period of time, said reduced temperature being in a range of about 37–45° F., and said retardation period of time being in a range of about 3–4 hours.

27. The method of claim 18, further comprising the step of placing the dough in a cooler at a reduced temperature for an extended retardation period of time, said reduced temperature being in a range of about 34–47° F., and said extended retardation period of time being in a range of about 12–16 hours.

* * * * *

UNITED STATES PATENT AND TRADEMARK OFFICE
CERTIFICATE OF CORRECTION

PATENT NO. : 6,004,600
DATED : December 21, 1999
INVENTOR(S) : Charles Van Over

It is certified that error appears in the above-indentified patent and that said Letters Patent is hereby corrected as shown below:

Col. 6, line 39, delete "4750" and insert --475°--.

Signed and Sealed this

Eighth Day of August, 2000

*Attest:*

Q. TODD DICKINSON

*Attesting Officer*         *Director of Patents and Trademarks*